United States Patent [19] | [11] Patent Number: 4,676,920
Culshaw | [45] Date of Patent: Jun. 30, 1987

[54] CREAMY SCOURING COMPOSITIONS

[76] Inventor: Stephen Culshaw, Procter & Gamble European Technical Center, Temselaan 100, B-1820 Strombeek-Bever, Belgium

[21] Appl. No.: 891,818

[22] Filed: Jul. 30, 1986

[30] Foreign Application Priority Data

Aug. 6, 1985 [GB] United Kingdom ................. 8519699

[51] Int. Cl.$^4$ ................................................ C09D 9/02

[52] U.S. Cl. .................................... 252/163; 252/166; 252/167; 252/168

[58] Field of Search ............... 252/123, 163, 164, 165, 252/166, 167, 168

[56] References Cited

U.S. PATENT DOCUMENTS

| | | | |
|---|---|---|---|
| 3,702,303 | 11/1972 | Clemens et al. | 252/163 |
| 3,915,902 | 10/1975 | Ancel et al. | 252/166 |
| 3,981,826 | 9/1976 | Munro | 252/163 |
| 4,287,080 | 9/1981 | Siklosi | 252/162 |
| 4,347,151 | 8/1982 | Lohr et al. | 252/163 |
| 4,457,856 | 7/1984 | Mitchell et al. | 252/166 |
| 4,508,634 | 4/1985 | Elepano et al. | 252/163 |
| 4,592,856 | 6/1986 | Kobayashi et al. | 252/167 |
| 4,615,821 | 10/1986 | Siklosi | 252/174.25 |

FOREIGN PATENT DOCUMENTS

| | | |
|---|---|---|
| 0126545 | 11/1984 | European Pat. Off. . |
| 137616 | 4/1985 | European Pat. Off. . |

*Primary Examiner*—Paul Lieberman
*Assistant Examiner*—Willie J. Thompson

[57] ABSTRACT

Viscous creamy scouring compositions substantially free of terpene solvents are disclosed. These compositions contain a binary system represented by a water-insoluble hydrocarbon solvent and a long-chain fatty alcohol.

7 Claims, No Drawings

CREAMY SCOURING COMPOSITIONS

TECHNICAL FIELD

The present invention relates to viscous creamy scouring compositions, which are substantially free of terpene-solvents, are stable and show excellent cleaning and shine performance.

These compositions, which comprise an abrasive, contain a binary system represented by a water-insoluble hydrocarbon solvent and a long-chain fatty-alcohol.

BACKGROUND

It is well known to formulate scouring compositions, in liquid or creamy form, containing solvents.

In particular, creamy scouring compositions containing an abrasive and a binary solvent system constituted of terpenes and polar solvents have been disclosed in European Patent Application 126,545 published on Nov. 28, 1984. In these compositions, the terpenes in addition to their cleaning abilities, contribute among others to emulsification. Their removal will therefore result in a significant decrease in viscosity which could only be prevented by addition of excessively high levels of thickener: the formulation of viscous scouring cleansers which are substantially free of terpene solvents was known to be difficult.

It has now been found that remarkably effective viscous creamy scouring cleanser compositions which are substantially free of terpene solvents can be formulated; In more detail, the combination, of a long-chain fatty alcohol with a particular water-insoluble hydrocarbon solvent in specific weight ratios, provides superior cleaning, allows excellent component emulsification and yields a creamy consistency.

The water-insoluble hydrocarbon solvents useful herein are selected from the group of $C_8$–$C_{20}$ paraffin oils and $C_{10}$–$C_{22}$ alkyl benzenes.

Paraffin oils have already been used as grease-removal solvents, and linear alkyl benzenes of upto $C_9$ alkyl chain length as well.

In European Patent Application 137,616, published Apr. 17, 1985, fatty acids/soaps are used in combination with a grease-removal solvent, both species at levels above 5% by weight of the total composition, to provide an emulsion.

It is an object of the present invention to provide viscous creamy cleanser compositions which are substantially free of terpene solvents.

It is a further object of the present invention to provide a cleanser composition with excellent cleaning and shine performance.

SUMMARY OF THE INVENTION

The present invention relates to viscous creamy scouring compositions being substantially free of terpene solvents, containing a surface active agent, an abrasive, and an organic solvent and if desired conventional additives, characterized in that the solvent contains a binary system represented by from 0.1% to 5% by weight of a water-insoluble hydrocarbon solvent selected from $C_{10}$–$C_{22}$ alkyl benzene and $C_8$–$C_{20}$ paraffin oils and;

from 0.1% to 5% by weight of a fatty alcohol having from 8 to 20 carbon atoms, the weight ratio of water-insoluble hydrocarbon solvent to fatty alcohol being in the range from 3:1 to 1:4.

DETAILED DESCRIPTION OF THE INVENTION

The surface-active agents, the abrasives, the solvent system and the optical ingredients are described in more detail hereinafter.

Unless indicated to the contrary, the %-indications stand for "%-by weight".

SURFACE ACTIVE AGENTS

Water-soluble detersive surfactants useful herein include well-known synthetic anionic, nonionic, amphoteric and zwitterionic surfactants and mixtures thereof. Typical of these are the alkyl benzene sulfates and sulfonates, paraffin sulfonates, olefin sulfonates, alkoxylated (especially ethoxylated) alcohols and alkyl phenols, amine oxides, sulfonates of fatty acids and of fatty acid esters, and the like, which are well-known in the detergency art. In generaly, such detersive surfactants contain an alkyl group in the $C_{10}$–$C_{18}$ range; the anionic detersive surfactants are most commonly used in the form of their sodium, potassium or triethanolammonium salts. The nonionics generally contain from 3 to 17 ethylene oxide groups per mole of hydrophobic moeity. Especially preferred in the compositions of the present invention are: $C_{12}$–$C_{16}$ alkyl benzene sulfonates, $C_{12}$–$C_{18}$ paraffin-sulfonates and the ethoxylated alcohols of the formula $RO(CH_2CH_2O)_n$, with R being a $C_{12}$–$C_{15}$ alkyl chain and n being an number from 6 to 10.

Anionic surfactants are frequently present at levels from 0.3 to 8% of the composition. Nonionic surfactants, are used at levels between 0.1% to 6% by weight of the composition. Mixtures of the like surfactants can also be used.

Abrasive—the abrasives employed herein are selected from water-insoluble, non-gritty materials well-known in the literature for their relatively mild abrasive properties. It is highly preferred that the abrasives used herein not be undesirably "scratchy". Abrasive materials having a Mohs hardness in the range of about 7, or below, are typically used; abrasives having a Mohs hardness of 3, or below, can be used to avoid scratches on aluminum or stainless steel finishes. Suitable abrasives herein include inorganic materials, especially such materials as calcium carbonate and diatomaceous earth, as well as materials such as Fuller's earth, magnesium carbonate, China clay, attapulgite, calcium hydroxyapatite, calcium orthophosphate, dolomite and the like. The aforesaid inorganic materials can be qualified as "strong abrasives". Organic abrasives such as urea-formaldehyde, methyl methacrylate melamine-formaldehyde resins, polyethylene spheres and polyvinylchloride can be advantageously used in order to avoid scratching on certain surfaces, especially plastic surfaces. When such "soft abrasives" are used, it can be desirable to include a builder in the composition.

Typically, abrasives have a particle size range of 10–1000 microns and are used at concentrations of 5% to 30% in the compositions. Thickeners are frequently added to suspend the abrasives.

SOLVENT SYSTEM

The solvent of the compositions herein contain a binary system represented by a water-insoluble solvent, and a long-chain fatty alcohol.

The term "water-insoluble" as used in the present specification, means that the solubility in water must be less than 5%.

The hydrocarbon solvents useful herein do not contain any other atom then C and H and are not cyclic. These solvents are selected from the group of $C_8$–$C_{20}$ paraffin oils and $C_{10}$–$C_{22}$ alkyl benzenes. Preferably, isoparaffins are used herein. $C_{10}$–$C_{14}$ isoparaffins are especially preferred.

Suitable iso-paraffin oils for use in the compositions of the invention are available under the trade names ISOPAR® G, H, and L, sold by ESSO.

The alkyl benzenes can have a linear or branched alkyl chain. Preferred are linear alkyl benzenes, especially those having an alkyl chain-length between $C_{12}$ and $C_{20}$.

The water-insoluble solvent is present in amounts from 0.1% to 5%, preferably from 0.5% to 2.5%.

The long-chain fatty alcohols useful herein have 8 to 20, preferably 12 to 18, carbon atoms in the alkyl chain. They may be saturated or unsaturated species.

The alcohol is used at levels of from 0.1% to 5%, preferably 0.5% to 2.5%. The weight ratio of water-insoluble hydrocarbon to fatty alcohol is in the range from 3:1 to 1:4, preferably from 2:1 to 1:2.

In a preferred embodiment, the solvent system contains, in combination with the aforesaid binary system, a water-soluble solvent. Suitable water-soluble solvents useful herein are benzyl alcohol and 2-Ethyl-1,3 hexanediol. The water-soluble solvent can also be selected from the water-soluble CARBITOL® solvents and water-soluble CELLOSOLVE solvents. Water-soluble CARBITOL® solvents are compound of the 2-(2-alkoxyethoxy)ethanol class wherein the alkoxy group is derived from ethyl, propyl or butyl; a preferred water-soluble Carbitol is 2-(2-butoxyethoxy)ethanol also known as butyl carbitol. Water-soluble CELLOSOLVE® solvents are compound of the 2-alkoxyethoxy ethanol class, with the butyl cellosolve being preferred. The water-soluble solvent can be used in levels ranging from 0.1 to 5% of the composition.

Optional Ingredients—The compositions herein can contain other ingredients which aid in their cleaning performance. For example, it is highly preferred that the compositions contain a detergent builder and/or metal ion sequestrant. Compounds classifiable and well-known in the art as detergent builders include the nitrilotriacetates, (NTA), polycarboxylates, citrates, water-soluble phosphates such as tri-polyphosphate and sodium ortho- and pyro-phosphates, silicates, and mixtures thereof. These builders are preferably not used in combination with strong abrasives like calcium carbonate, but are recommended in combination with soft organic abrasives like polyvinylchloride.

Metal ion sequestrants of lower metal sequestration constant can advantageously be used in combination with strong or soft abrasives.

Those metal ion sequestrants include ethylene diamine tetraacetate (EDTA), iminodiacetade materials like N(2-hydroxyethyl)iminodiacetate (HEIDA), amino-polyphosponates (DEQUEST) and phosphates. Preferred builders/sequestrants for use in the present invention are NTA, EDTA, and HEIDA and mixtures of EDTA and HEIDA.

The builders/sequestrant will be present at levels of from 1% to 15%.

Soaps can also be present in the compositions of the invention, in order to provide suds control. Soap prepared from coconut oil fatty acids is preferred.

Soaps are used in amounts ranging from 0.05% to 3% by weight of the composition.

Thickeners will preferably be included in the compositions of the invention, mainly in order to suspend the abrasive; high levels of thickeners are detrimental to the performance because they are difficult to rinse from the cleaned surfaces. Accordingly, the level will be kept under 2%, preferably from 0.2% to 1.5%. Common thickeners such as the polyacrylates, xanthan gums, carboxymethyl celluloses, swellable smectite clays, and the like, can be used herein.

Optional components are also represented by ingredients typically used in commercial products to provide aesthetic or additional product performance benefits. Typical ingredients include pH regulants, perfumes, dyes, optical brighteners, soil suspending agents, detersive enzymes, gel-control agents, freeze-thaw stabilizers, bactericides, preservatives, and the like.

Another optional ingredient for use herein is represented by conventional detergent hydrotropes. Examples of suitable hydrotropes are urea, monoethanolamine, diethanolamine, triethanolamine and the soliudm potassium, ammonium and alkanol ammonium salts of xylene-, toluene-, ethylbenzene- and isopropyl-benzene sulfonates. It is a particular feature of the present invention, however, that stable formulations can be prepared without the need for hydrotropic materials of this kind.

The compositions herein typically contain up to about 90% water as a carrier. By way of example the water-level can vary in the range from e.g. 50% to 80%. Water-alcohol (e.g., ehtanol, isopropanol, butanol, etc.) mixtures can also be used. Alkylated polysaccharides can be used to increase the stability and performancce characteristics of the compositions.

The compositions herein are preferably formulated in the alkaline pH range, generally in the range of pH 8–11, preferably about 10–10.8. Caustics such as sodium hydroxide and sodium carbonate can be used to adjust and buffer the pH as desired.

The following examples are given by way of illustrating the compositions herei, but are not intended to be limiting of the scope of the invention.

ABBREVIATIONS

NaPS: Sodium $C_{13}$ to $C_{16}$ paraffin sulfonate
LAS: Sodium salt of linear $C_{11}$–$C_8$ alkyl benzene sulfonate
LAB: Linear $C_{10-22}$ Alkyl Benzene
Lutensol®A07: Condensate of 1 mole $C_{12}$–$C_{14}$ fatty alcohol with 7 moles of ethylene oxide
Dobanol®45/7: $C_{14}$–$C_{15}$ oxoalcohol with 7 moles of ethylene oxide per mole of alcohol
$HC_nFA$: Narrow cut, hardened, coconut fatty acid.
NTA: Sodium nitrilotriacetate
EDTA: Ethylene Diamine Tetraacetate
HEIDA: N-(2-hydroxyethyl)imino diacetate
$CaCO_3$: Calcium Carbonate
Sokalan®PHC 25: Crosslinked polyacrylate thickener
ETHD: 2-Ethyl-1,3-hexanediol Liquid cleansers were prepared by mixing the listed ingredients in the stated proportions (% by weight).

| Ingredients | Comp A | Ex I | Ex II | Ex III | Ex IV | Ex V |
|---|---|---|---|---|---|---|
| NaPS | 3.0 | 3.0 | 3.0 | 3.0 | 3.0 | 3.0 |
| LAS | 0.6 | 0.6 | 0.6 | 0.6 | 0.6 | 0.6 |
| Lutensol ® A07 | 0.3 | 0.3 | 0.3 | 0.3 | 0.3 | 0.3 |
| $Na_2CO_3$ | 3.0 | 3.0 | 3.0 | 3.0 | 3.0 | 3.0 |
| $HC_nFA$ | 0.2 | 0.2 | 0.2 | 0.2 | 0.2 | 0.2 |

-continued

| Ingredients | Comp A | Ex I | Ex II | Ex III | Ex IV | Ex V |
|---|---|---|---|---|---|---|
| Benzyl Alcohol | 1.3 | — | — | — | — | — |
| Butyl Carbitol | — | 4.0 | 4.0 | 4.0 | 4.0 | 4.0 |
| Orange Terpenes | 1.9 | — | — | — | — | — |
| Isopar ® G | — | 1.6 | 1.6 | .13 | — | — |
| $C_{12}$ LAB | — | — | — | — | 1.6 | 1.6 |
| Dodecanol | — | 1.6 | 1.6 | 1.3 | 1.6 | 1.6 |
| NTA | — | — | 3.0 | 3.0 | 3.0 | 3.0 |
| $CaCO_3$ | 30 | 30 | 30 | — | 30 | — |
| PVC | — | — | — | 10 | — | 10 |
| Sokalan ® PHC25 | 0.65 | 0.5 | 0.5 | 0.5 | 0.5 | 0.5 |
| Water | | | up to 100 | | | |

The compositions of Examples I to V showed a high viscosity and an excellent stability.

The above compositions were comparatively tested on synthetic soils representative of typical hard surface household soils. The test-soils were prepared as follows.

(a) HBTS soil: is composed of 250 ml isopropyl alcohol, 75 g. calcium stearate powder and 0.5 g. carbon black. It is applied on an enamel-coated metal plate (cleaned with a detergent and then with alcohol) with a paint roller, and the plates are baked at 180° C. for 20 minutes.

(b) KD soil: is composed of 25% HSW® soil with carbon black (2), 37.5% Crisco® (1) oil, 37.5% Puritan® (1) oil. This soil is rolled onto stainless steel plates (beforehand cleaned with a detergent and then with alcohol) using a paint roller. A very thin uniform layer is needed since the soil is difficult to cure. The plates are placed in the oven at 115° C. ("soft soil") or 170° C. ("hard soil") for 2 hours and then allowed to age at least 1 day.

(1) commercial cooking oil sold by The Procter & Gamble Company.

(2) commercial soil sold by Chem Pack Inc., U.S.A.

The testing conditions were as follows:

All test were run with the aid of an Erichsen washability machine. A sponge of approximately 9.5×5×4 cm was used after being carefully washed under hot running water and squeezed through drying rolls. 5 g of the undiluted cleanser to be tested was spread over one side of the sponge. The number of strokes of the cleaning machine varied with the type of soil. Performance readings were done as soon as visible cleaning differences became noticeable. The gradings were done visually by three judges working independently. The performance benefits were estblished via a paired comparison with duplicates as follows. A 0–4 scale was used whereby: 0 means no difference; 1=probable difference; 2=consistent difference; 3=clear difference; 4=big difference.

The testing results were as listed below. Prior art composition A was the reference against which compositions of examples I, II, III, IV and V were compared.

| soil | Comp A | Ex I | Ex II | Ex IV | Ex III | Ex V |
|---|---|---|---|---|---|---|
| KD | | | | | | |
| "Hard" | Ref | +2 | +2 | +2 | | |
| "Soft" | Ref | +1 | +1 | +1 | | |
| HBTS | Ref | +1 | +2.5 | +2.5 | +2.5 | +2.5 |

The above test clearly confirms the significant performance benefits derivable from the inventive compositions vs. related art composition.

In addition, the following compositions are prepared:

| Ingredients | Ex. VI | Ex. VII | Ex. VIII | Ex. IX | Ex. X | Ex. XI |
|---|---|---|---|---|---|---|
| NaPS | 3.0 | 3.0 | 3.2 | 3.2 | 3.5 | 2.5 |
| LAS | 0.6 | 0.6 | 0.4 | 0.4 | 0.3 | 1.0 |
| Lutensol ® A07 | 0.3 | — | 0.2 | — | 0.3 | — |
| Dobanol ® 4S/7 | — | 0.3 | — | 0.2 | — | 0.4 |
| $NaCO_3$ | 3.0 | 3.0 | 3.0 | 3.0 | 3.0 | 3.0 |
| $HC_nFA$ | 0.2 | 0.2 | 0.2 | 0.2 | 0.2 | 0.2 |
| Benzylalcohol | 2.0 | 3.0 | — | — | 2.0 | — |
| Butyl carbitol | — | — | 4.0 | 2.0 | 2.0 | — |
| ETHD | — | — | — | 2.0 | — | 4.0 |
| Isopar ® G | 0.6 | — | 1.0 | — | 1.0 | — |
| $C_{12}$ L.A.B. | — | 0.6 | — | 1.0 | — | 1.0 |
| Dodecanol | 0.6 | 0.6 | 1.0 | 1.0 | 1.0 | 1.0 |
| NTA | — | 3.0 | — | — | — | — |
| EDTA | — | — | 1.0 | — | 4.0 | — |
| HEIDA | — | — | 4.0 | 4.0 | — | 3.0 |
| $CaCO_3$ | 30.0 | 30.0 | — | — | — | — |
| PVC | — | — | 10.0 | 10.0 | 10.0 | 10.0 |
| Sokalan ® PHC25 | 0.5 | 0.5 | 0.5 | 0.5 | 0.5 | 0.5 |
| Water | | | balance to 100 | | | |

I claim:

1. A viscous, creamy liquid scouring cleanser which is substantially free of terpene solvents containing a surface-active agent, an abrasive, and a binary solvent system represented by:

from 0.1% to 5% by weight of a water-insoluble hydrocarbon solvent, selected from $C_{10}$–$C_{22}$ alkyl benzenes and $C_8$–$C_{20}$ paraffins; and from 0.1% to 5% by weight of a fatty alcohol having from 8 to 20 carbon atoms;

the weight ratio of water-insoluble hydrocarbon solvent to fatty alcohol being in the range from 3:1 to 1:4.

2. A composition in accordance with claim 1 wherein the paraffin oil is a $C_{10}$–$C_{14}$ isoparaffin.

3. A composition in accordance with claim 1 wherein the alkyl benzene has a $C_{12}$–$C_{20}$ linear alkyl chain.

4. A composition in accordance with claim 1 wherein the water-insoluble hydrocarbon solvent is present at levels from 0.5% to 2.5% by weight of the composition.

5. A composition in accordance with claim 1, wherein the fatty alcohol has from 12 to 18 carbon atoms, and is present at a level of from 0.5% to 2.5% by weight.

6. A composition in accordance with claim 1 wherein the weight ratio of water-insoluble hydrocarbon solvent to fatty alcohol is in the range from 2:1 to 1:2.

7. A composition according to claim 1 which contains, in addition to the binary system, a water-soluble solvent selected from benzyl alcohol, 2-(2-butoxyethoxy)ethanol and 2-ethyl-1,3-hexanediol.

* * * * *